(12) United States Patent
Barish et al.

(10) Patent No.: US 11,436,835 B2
(45) Date of Patent: Sep. 6, 2022

(54) METHOD FOR DETECTING TRAILER STATUS USING COMBINED 3D ALGORITHMS AND 2D MACHINE LEARNING MODELS

(71) Applicant: ZEBRA TECHNOLOGIES CORPORATION, Lincolnshire, IL (US)

(72) Inventors: Justin F. Barish, Kings Park, NY (US); Jyotsna Prasad, Dallas, TX (US); Adithya H. Krishnamurthy, Hicksville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 213 days.

(21) Appl. No.: 16/788,522

(22) Filed: Feb. 12, 2020

(65) Prior Publication Data

US 2021/0248381 A1 Aug. 12, 2021

(51) Int. Cl.
*G06V 20/52* (2022.01)
*G06N 20/00* (2019.01)
*G06T 7/60* (2017.01)
*G06T 7/11* (2017.01)

(52) U.S. Cl.
CPC ............. *G06V 20/52* (2022.01); *G06N 20/00* (2019.01); *G06T 7/11* (2017.01); *G06T 7/60* (2013.01); *G06T 2207/10028* (2013.01); *G06T 2207/30232* (2013.01); *G06T 2210/22* (2013.01)

(58) Field of Classification Search
CPC ........ G06N 20/00; G06N 3/08; G06N 3/0454; G06N 3/0445; G06K 9/00771; G06K 2209/23; G06T 7/11; G06T 7/60; G06T 2207/30232; G06T 2207/10028; G06T 2210/22; G06V 20/52; G06V 2201/08
See application file for complete search history.

(56) References Cited

U.S. PATENT DOCUMENTS

| | | | |
|---|---|---|---|
| 9,102,055 B1* | 8/2015 | Konolige | G06T 7/13 |
| 2016/0104364 A1* | 4/2016 | Brooks | B65G 69/287 |
| | | | 340/686.1 |
| 2017/0101278 A1* | 4/2017 | Stone | G08B 21/02 |
| 2020/0193196 A1* | 6/2020 | Saydag | G06N 3/0454 |

* cited by examiner

*Primary Examiner* — Vu Le
*Assistant Examiner* — Tracy Mangialaschi
(74) *Attorney, Agent, or Firm* — Yuri Astvatsaturov

(57) ABSTRACT

Methods for determining a trailer status are disclosed herein. An example method includes capturing a three-dimensional image and a two-dimensional image. The three-dimensional image may comprise three-dimensional image data, and the two-dimensional image may comprise two-dimensional image data. The example method may further include determining a first trailer status based on the three-dimensional image data, and determining a second trailer status based on the two-dimensional image data. The example method may further include comparing the first trailer status to the second trailer status to determine a final trailer status.

11 Claims, 8 Drawing Sheets

700

| 3D IMAGE ANALYSIS | | 2D IMAGE ANALYSIS | | | | |
|---|---|---|---|---|---|---|
| | | CLOSED | OPEN | AJAR | PARKING LOT | UNKNOWN |
| | CLOSED | CLOSED | CLOSED | AJAR | PARKING LOT | CLOSED |
| | OPEN/'RESET' | CLOSED | OPEN | AJAR | PARKING LOT | OPEN |

METHOD FOR DETECTING TRAILER STATUS USING COMBINED 3D ALGORITHMS AND 2D MACHINE LEARNING MODELS

BACKGROUND

In the commercial shipping industry, Time of Flight (ToF) sensors are frequently used to analyze the interior of shipping containers using three-dimensional (3D) and two-dimensional (2D) image data. A first step in analyzing shipping container interiors is accurately determining a trailer status, such as whether the trailer door is open or closed. The trailer status impacts load metrics and other analytics by facilitating a proper association of image data with a specific loading sequence. As such, each trailer status requires unique handling and must be accurately determined to avoid skewing the analytics the ToF sensors are intended to perform.

Unfortunately, ToF sensors often capture abundant noise when imaging trailers due to the reflectivity of trailer materials and other effects. This noise occasionally causes errors in trailer status determination and limits the types of trailer statuses 3D image data algorithms can detect. Moreover, comparing 2D image data to the 3D image data often fails to resolve ambiguities because the trailer status typically appears similar in both sets of image data.

Correspondingly, a major point of emphasis in the commercial shipping industry is accurately and efficiently determining a trailer status prior to performing trailer interior analytics. Making this determination is a substantial challenge for traditional systems as traditional systems cannot utilize 2D image data in tandem with 3D image data to make a robust trailer status determination. A traditional system may, for example, mistakenly determine that a trailer door is partially closed (ajar) when the trailer is partially pulled away from a loading dock, or that a trailer door is open when the trailer door is fully closed.

Accordingly, there is a need for methods and systems for quickly and accurately determining a trailer status to facilitate consistent, reliable container analytics.

SUMMARY

In an embodiment, the present invention is a method for determining a trailer status. The method includes capturing a three-dimensional image and a two-dimensional image. The three-dimensional image is comprised of three-dimensional image data, and the two-dimensional image is comprised of two-dimensional image data. The method further includes determining a first trailer status based on the three-dimensional image data, and determining a second trailer status based on the two-dimensional image data. The method further includes comparing the first trailer status to the second trailer status to determine a final trailer status.

In a variation of this embodiment, determining the second trailer status further includes training a machine learning model based on (i) a set of prior two-dimensional image data and (ii) a set of corresponding trailer statuses. The variation further includes applying the machine learning model to the two-dimensional image data to generate the second trailer status. The set of corresponding trailer statuses includes indications that a respective image in the set of prior two-dimensional image data represents at least one of (i) a closed trailer door, (ii) an ajar trailer door, (iii) an open trailer door, (iv) a parking lot, or (v) an unknown representation.

In another variation of this embodiment, determining the second trailer status further includes training a first machine learning model based on (i) a first set of prior two-dimensional image data and (ii) a first set of corresponding trailer statuses, and a second machine learning model based on (i) a second set of prior two-dimensional image data and (ii) a second set of corresponding trailer statuses. The variation further includes applying the first machine learning model to the two-dimensional image data to generate a preliminary trailer status, wherein the preliminary trailer status indicates one of (i) a closed trailer door, (ii) an other trailer status, or (iii) an unknown trailer status.

In response to generating a preliminary trailer status indicating the other trailer status, the variation further includes applying the second machine learning model to the two-dimensional image data to generate the second trailer status. In response to generating a preliminary trailer status indicating the other trailer status, the variation further includes cropping the two-dimensional image data, and applying the second machine learning model to the cropped two-dimensional image data to generate the second trailer status. Further in this variation, the first set of corresponding trailer statuses includes indications that a respective image in the first set of prior two-dimensional image data represents at least one of (i) the closed trailer door, (ii) the other trailer status, or (iii) the unknown trailer status. The second set of prior two-dimensional image data is a set of prior cropped two-dimensional data, and the second set of corresponding trailer statuses includes indications that a respective image in the set of prior cropped two-dimensional image data represents at least one of (i) an ajar trailer door, (ii) an open trailer door, or (iii) a parking lot.

In yet another variation of this embodiment, comparing the first trailer status to the second trailer status to determine the final trailer status further comprises determining whether the first trailer status is substantially similar to the second trailer status. Responsive to determining that the first trailer status is substantially similar to the second trailer status, the variation further includes determining the final trailer status based on either the first trailer status or the second trailer status. Responsive to determining that the first trailer status is not substantially similar to the second trailer status, the variation further includes determining the final trailer status based on a set of tested values indicating which of the first trailer status and the second trailer status is more accurate.

In another embodiment, the present invention is an apparatus for determining a trailer status. The apparatus includes a housing, an imaging assembly, and a controller communicatively coupled to the imaging assembly. The imaging assembly is at least partially within the housing and configured to capture a three-dimensional image and a two-dimensional image. The three-dimensional image is comprised of three-dimensional image data, and the two-dimensional image is comprised of two-dimensional image data. The controller has a processor and a memory, wherein the memory stores instructions that, when executed by the processor, cause the controller to determine a first trailer status based on the three-dimensional image. The instructions, when executed by the processor, further cause the controller to determine a second trailer status based on the two-dimensional image data, and compare the first trailer status to the second trailer status to determine a final trailer status.

In a variation of this embodiment, the instructions further cause the controller to train a machine learning model based on (i) a set of prior two-dimensional image data and (ii) a set of corresponding trailer statuses, and apply the machine learning model to the two-dimensional image data to generate the second trailer status. In this variation, the set of corresponding trailer statuses includes indications that a respective image in the set of prior two-dimensional image data represents at least one of (i) a closed trailer door, (ii) an ajar trailer door, (iii) an open trailer door, (iv) a parking lot, or (v) an unknown representation.

In another variation of this embodiment, the instructions further cause the controller to train a first machine learning model based on (i) a first set of prior two-dimensional image data and (ii) a first set of corresponding trailer statuses, and a second machine learning model based on (i) a second set of prior two-dimensional image data and (ii) a second set of corresponding trailer statuses. In this variation, the instructions further cause the controller to apply the first machine learning model to the two-dimensional image data to generate a preliminary trailer status, wherein the preliminary trailer status indicates one of (i) a closed trailer door, (ii) an other trailer status, or (iii) an unknown trailer status.

Further in this variation, and in response to generating a preliminary trailer status indicating the other trailer status, the instructions further cause the controller to apply the second machine learning model to the two-dimensional image data to generate the second trailer status. In this variation, the instructions further cause the controller to, in response to generating a preliminary trailer status indicating the other trailer status, crop the two-dimensional image data, and apply the second machine learning model to the cropped two-dimensional image data to generate the second trailer status. In this variation, the first set of corresponding trailer statuses includes indications that a respective image in the first set of prior two-dimensional image data represents at least one of (i) the closed trailer door, (ii) the other trailer status, or (iii) the unknown trailer status. In this variation, the second set of prior two-dimensional image data is a set of prior cropped two-dimensional data, and the second set of corresponding trailer statuses includes indications that a respective image in the set of prior cropped two-dimensional image data represents at least one of (i) an ajar trailer door, (ii) an open trailer door, or (iii) a parking lot.

In yet another variation of this embodiment, the instructions further cause the controller to compare the first trailer status to the second trailer status to determine the final trailer status by determining whether the first trailer status is substantially similar to the second trailer status. In this variation, and responsive to determining that the first trailer status is substantially similar to the second trailer status, the instructions further cause the controller to determine the final trailer status based on either the first trailer status or the second trailer status. In this variation, and responsive to determining that the first trailer status is not substantially similar to the second trailer status, the instructions further cause the controller to determine the final trailer status based on a set of tested values indicating which of the first trailer status and the second trailer status is more accurate.

In yet another embodiment, the present invention is a system for determining a trailer status. The system includes a user interface, and a trailer monitoring unit (TMU) mounted proximate a loading bay and communicatively connected with the user interface. The TMU includes a housing, and an imaging assembly at least partially within the housing and configured to capture a three-dimensional image and a two-dimensional image. The three-dimensional image is comprised of three-dimensional image data, and the two-dimensional image is comprised of two-dimensional image data. The TMU is configured to determine a first trailer status based on the three-dimensional image data, and determine a second trailer status based on the two-dimensional image data. The TMU is further configured to compare the first trailer status to the second trailer status to determine a final trailer status.

In a variation of this embodiment, the TMU is further configured to train a machine learning model based on (i) a set of prior two-dimensional image data and (ii) a set of corresponding trailer statuses, and apply the machine learning model to the two-dimensional image data to generate the second trailer status. In this variation, the set of corresponding trailer statuses includes indications that a respective image in the set of prior two-dimensional image data represents at least one of (i) a closed trailer door, (ii) an ajar trailer door, (iii) an open trailer door, (iv) a parking lot, or (v) an unknown representation.

In another variation of this embodiment, the TMU is further configured to train a first machine learning model based on (i) a first set of prior two-dimensional image data and (ii) a first set of corresponding trailer statuses, and a second machine learning model based on (i) a second set of prior two-dimensional image data and (ii) a second set of corresponding trailer statuses. In this variation, the TMU is further configured to apply the first machine learning model to the two-dimensional image data to generate a preliminary trailer status, wherein the preliminary trailer status indicates one of (i) a closed trailer door, (ii) an other trailer status, or (iii) an unknown trailer status.

Further in this variation, and in response to generating a preliminary trailer status indicating the other trailer status, the TMU is further configured to apply the second machine learning model to the two-dimensional image data to generate the second trailer status. In this variation, and in response to generating a preliminary trailer status indicating the other trailer status, the TMU is further configured to crop the two-dimensional image data. In this variation, the TMU is further configured to apply the second machine learning model to the cropped two-dimensional image data to generate the second trailer status.

Still further in this variation, the first set of corresponding trailer statuses includes indications that a respective image in the first set of prior two-dimensional image data represents at least one of (i) the closed trailer door, (ii) the other trailer status, or (iii) the unknown trailer status. In this variation, the second set of prior two-dimensional image data is a set of prior cropped two-dimensional data, and the second set of corresponding trailer statuses includes indications that a respective image in the set of prior cropped two-dimensional image data represents at least one of (i) an ajar trailer door, (ii) an open trailer door, or (iii) a parking lot.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 7 illustrates a decision model utilized in the method of FIG. 4, and in accordance with embodiments herein.

Figure 1A:
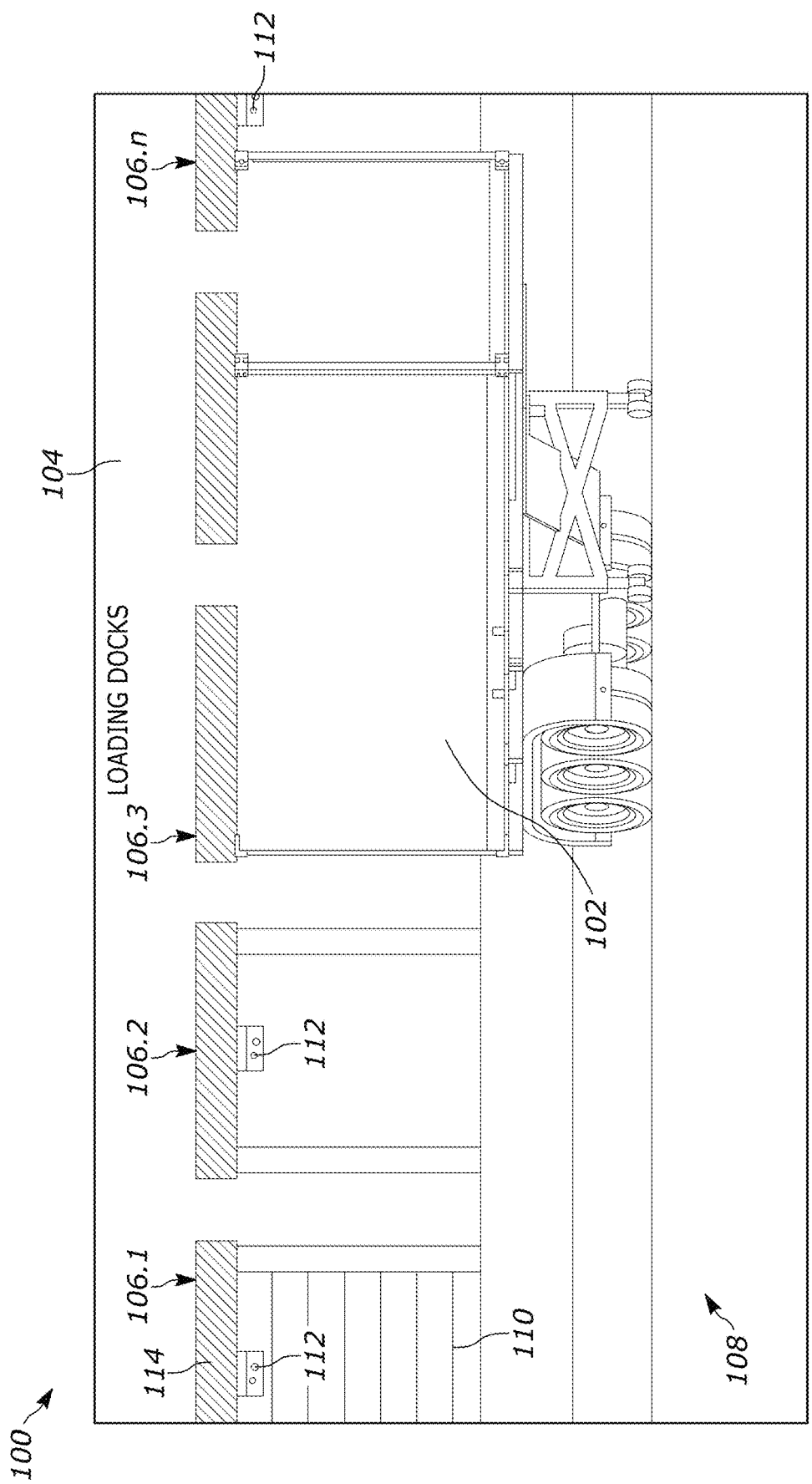
FIG. 1A illustrates a loading facility, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, shipping companies seek to accurately and efficiently analyze the load status of each container for which they are responsible. Many companies incorporate imaging systems to provide this analysis (e.g., trailer monitoring units (TMUs)). However, these traditional imaging systems suffer from a number of drawbacks, such as being unable to effectively determine a trailer status prior to performing load analytics.

Consequently, the methods/systems of the present disclosure provide solutions to the trailer status determination problems associated with the traditional imaging systems. Namely, a method of the present disclosure may include capturing a three-dimensional image and a two-dimensional image. The three-dimensional image may comprise three-dimensional image data, and the two-dimensional image may comprise two-dimensional image data. The method may further include determining a first trailer status based on the three-dimensional image data. The method may further include determining a second trailer status based on the two-dimensional image data, and comparing the first trailer status to the second trailer status to determine a final trailer status.

FIG. 1A illustrates an exemplary environment where embodiments of the present invention may be implemented. In the present example, the environment is provided in a form of a loading dock 100 (also referred to as a loading facility) where containers 102 are loaded with various goods and/or where various goods are unloaded from the containers 102. The loading dock 100 is comprised of a facility 104 having a plurality of loading bays 106.1-106.n facing a loading facility lot 108 where vehicles, such as semis (not shown), deliver and pick up containers 102. To be loaded, each trailer 102 is backed toward the facility 104 such that it is generally perpendicular with the wall having the plurality of loading bays 106.1-106.n, and in line with one of the loading bays (in this case 106.3). As illustrated, each respective loading bay of the plurality of loading bays 106.1-106.n includes a bay door 110 that can be lowered to close the respective loading bay or raised to open the respective loading bay allowing the interior of the facility 104 to be accessible therethrough. Additionally, each respective loading bay is provided with a respective TMU 112. The respective TMU 112 is mounted near the trailer 102 loading area, preferably in the upper section of the respective loading bay outside the door 110 facing the loading facility lot 108 or an interior/rear of a trailer 102 if one is docked at the respective loading bay. To protect the respective TMU 112 from inclement weather, it could be mounted under a bay awning 114. Once docked, goods can be loaded onto/unloaded from the trailer 102 with the respective TMU 112 maintaining a view of the rear/inside of the trailer 102.

Figure 1B:
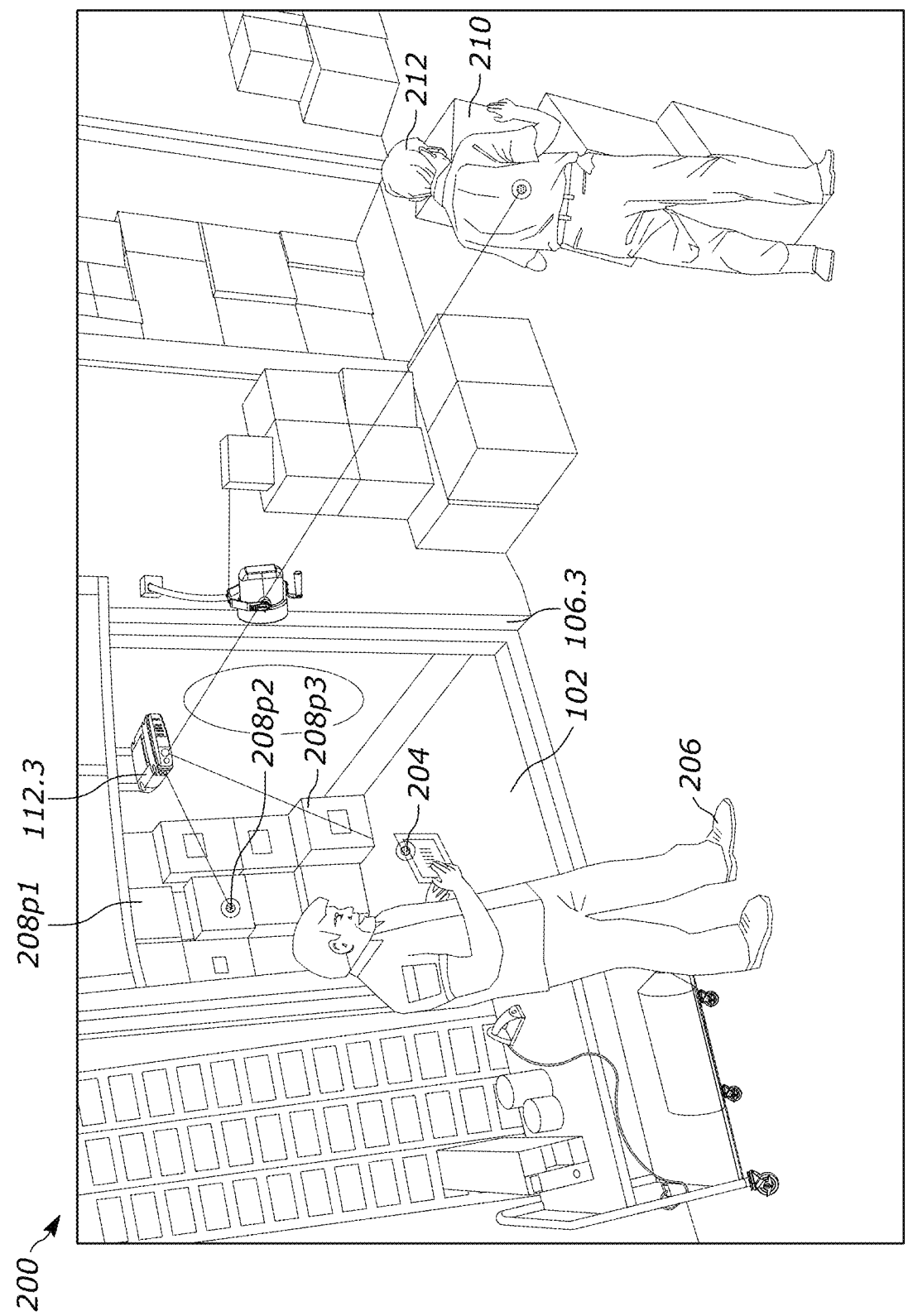
FIG. 1B illustrates an interior of the loading facility of FIG. 1A.

FIG. 1B is a perspective view 200 of the loading facility 100 of FIG. 1A depicting trailer 102 docked at a loading bay 106.3, in accordance with example embodiments herein. For example, FIG. 1B depicts trailer 102, which in the embodiment of FIG. 1B is an interior view of the trailer 102 of FIG. 1A. FIG. 1B also depicts loading bay 106.3, which in the embodiment of FIG. 1B is an interior view of the loading bay 106.3 of FIG. 1A. As depicted in FIG. 1B, trailer 102 is docked with loading bay 106.3 exposing the interior of trailer 102 to the interior of loading facility 100. Trailer 102 includes packages, boxes, and/or other transportable objects or goods, including packages 208p1-208p3. The packages 208p1-208p3 may be in a state of being loaded or unloaded into trailer 102. For example, worker 212 may be in a state of loading or unloading additional packages 210 into or out of trailer 102. In some embodiments, manager 206 may oversee, assist, or otherwise additionally facilitate the loading or unloading packages, boxes, and/or other transportable objects or goods (e.g., packages 208p1-208p3 or 210) into or out of the trailer 102. For example, manager 206 may utilize a dashboard app executing on client device 204 as described herein.

FIG. 1B also depicts a TMU 112.3. TMU 112.3 may include one or more processors and one or more computer memories for storing image data, and/or for executing apps that perform analytics or other functions as described herein. In various embodiments, and as shown in FIG. 1B, the TMU 112.3 may be mounted within loading facility 100 and oriented in the direction of trailer 102 to capture 3D and/or 2D image data of the interior of trailer 102. For example, as shown in FIG. 1B, TMU 112.3 may be oriented such that the 3D and 2D cameras of TMU 112.3 look down the length of the trailer 102 so that TMU 112.3 may scan or sense the walls, floor, ceiling, packages (e.g., 208p1-208p3 or 210), or other objects or surfaces with trailer 102 to determine the 3D and 2D image data. The image data may be processed by the one or more processors and/or memories of the TMU 112.3 (or, in some embodiments, one or more remote processors and/or memories of a server) to implement analysis, functions, such as graphical or imaging analytics, as described by the one or more various flowcharts, block diagrams, methods, functions, or various embodiments herein.

In some embodiments, for example, the TMU 112.3 may process the 3D and 2D image data, as scanned or sensed from the 3D-depth camera and photo-realistic camera, for use by other devices (e.g., client device 204). For example, the one or more processors and/or one or more memories of the TMU 112.3 may process the image data scanned or sensed from trailer 102. The processing of the image data may generate post-scanning data that may include metadata, simplified data, normalized data, result data, status data, or alert data as determined from the original scanned or sensed image data. In some embodiments, the image data and/or the post-scanning data may be sent to a client application, such as a dashboard application (app) described herein, for viewing, manipulation, or otherwise interaction. In other embodiments, the image data and/or the post-scanning data may be sent to a server for storage or for further manipulation.

As shown in FIG. 1B, the image data and/or the post-scanning data may be received on client device 204. Client device 204 may implement a dashboard app to receive the image data and/or the post-scanning data and display such data, e.g., in graphical or other format, to manager 206 to facilitate the unloading or loading of packages (e.g., 208p1-208p3 or 210), as described herein. In some embodiments, the dashboard app may receive the image data and/or the post-scanning data and display such data in real-time. Client device 204 may be a mobile device, such as a tablet, smartphone, laptop, or other such mobile computing device. Client device 204 may also include wired or wireless transceivers for receiving image data and/or post-scanning data as described herein. Such wired or wireless transceivers may implement one or more communication protocol standards including, for example, TCP/IP, WiFi (802.11b), Bluetooth, or any other similar communication protocols or standards.

In some embodiments, the image data and/or the post-scanning data may be sent to a server. In such embodiments, the server may generate post-scanning data, that may include metadata, simplified data, normalized data, result data, status data, or alert data as determined from the original scanned or sensed image data provided by the TMU 112.3. As described herein, the server may store such data, and may also send the image data and/or the post-scanning data to a dashboard app, or other app, implemented on a client device, such as the dashboard app implemented on client device 204 of FIG. 1B.

Figure 2:
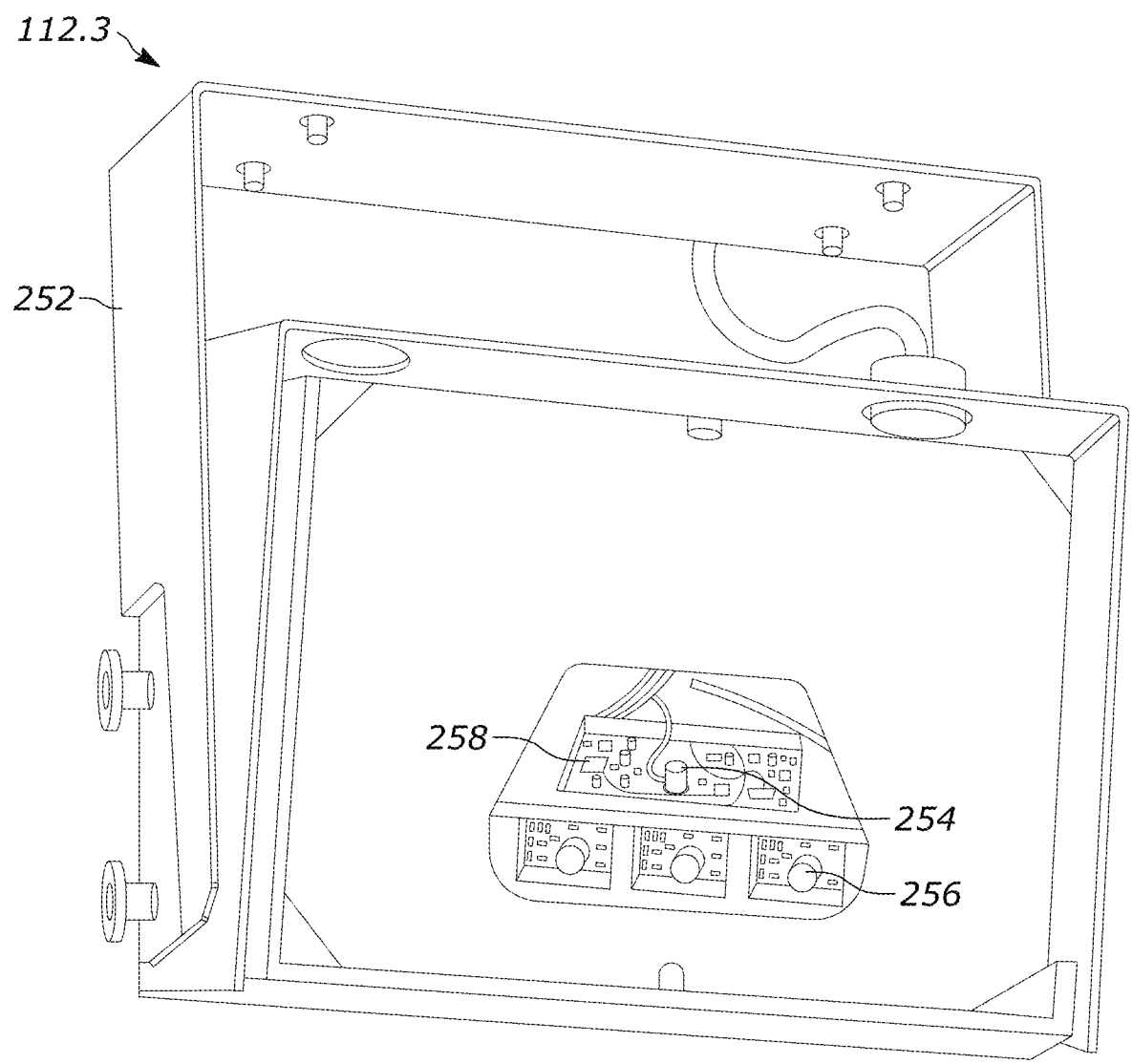
FIG. 2 illustrates a trailer monitoring unit (TMU), in accordance with embodiments described herein.

In the currently described embodiment and as shown in FIG. 2, the TMU 112.3 is a mountable device that includes a mounting bracket 252 for orienting or otherwise positioning the TMU 112.3 within a loading facility (e.g., loading facility 100). The TMU 112.3 may further include one or more processors and one or more memories for processing image data as described herein. For example, the TMU 112.3 may include flash memory used for determining, storing, or otherwise processing the imaging data/datasets and/or post-scanning data. In addition, TMU 112.3 may further include a network interface to enable communication with other devices.

TMU 112.3 may include a 3D camera 254 (also referenced herein as a "Time-of-Flight (ToF) camera") for capturing, sensing, or scanning 3D image data/datasets. For example, in some embodiments, the 3D camera 254 may include an Infra-Red (IR) projector and a related IR camera. In such embodiments, the IR projector projects a pattern of IR light or beams onto an object or surface, which, in various embodiments herein, may include surfaces or areas of a predefined search space (e.g., loading dock 106.3) or objects within the predefined search area, such as boxes or packages (e.g., packages 208p1-208p3) and trailer 102. The IR light or beams may be distributed on the object or surface in a pattern of dots or points by the IR projector, which may be sensed or scanned by the IR camera. A depth-detection app, such as a depth-detection app executing on the one or more processors or memories of TMU 112.3, can determine, based on the pattern of dots or points, various depth values, for example, depth values of the predefined search area. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection app and/or TMU 112.3 to generate a depth map. The depth map may represent a 3D image of, or contain 3D image data of, the objects or surfaces that were sensed or scanned by the 3D camera 254, for example, the trailer 102 and any objects, areas, or surfaces therein. The 3D camera 254 may also be configured to capture other sets of image data in addition to the 3D image data, such as grayscale image data, ambient image data, amplitude image data, and/or any other suitable image data or combination thereof.

TMU 112.3 may further include a photo-realistic camera 256 for capturing, sensing, or scanning 2D image data. The photo-realistic camera 256 may be a RGB (red, green, blue) based camera for capturing 2D images having RGB-based pixel data. In some embodiments, the photo-realistic camera 256 may capture 2D images, and related 2D image data, at the same or similar point in time as the 3D camera 254 such that the TMU 112.3 can have both sets of 3D image data and 2D image data available for a particular surface, object, area, or scene at the same or similar instance in time. In embodiments, the 3D camera 254 and the photo-realistic camera 256 may be a single imaging apparatus configured to capture 3D depth image data simultaneously with 2D image data. Consequently, the captured 2D images and the corresponding 2D image data may be depth-aligned with the 3D images and 3D image data.

TMU 112.3 may also include a processing board 258 configured to, for example, perform container fullness estimation and other advanced analytical algorithms based on images captured by the cameras 254, 256. Generally, the processing board 258 may include one or more processors and one or more computer memories for storing image data, and/or for executing apps that perform analytics or other functions as described herein. The processing board 258 may also include transceivers and/or other components configured to communicate with external devices/servers. The processing board 258 may thus transmit and/or receive data or other signals to/from external devices/servers before, during, and/or after performing the analytical algorithms described herein.

Figure 3:
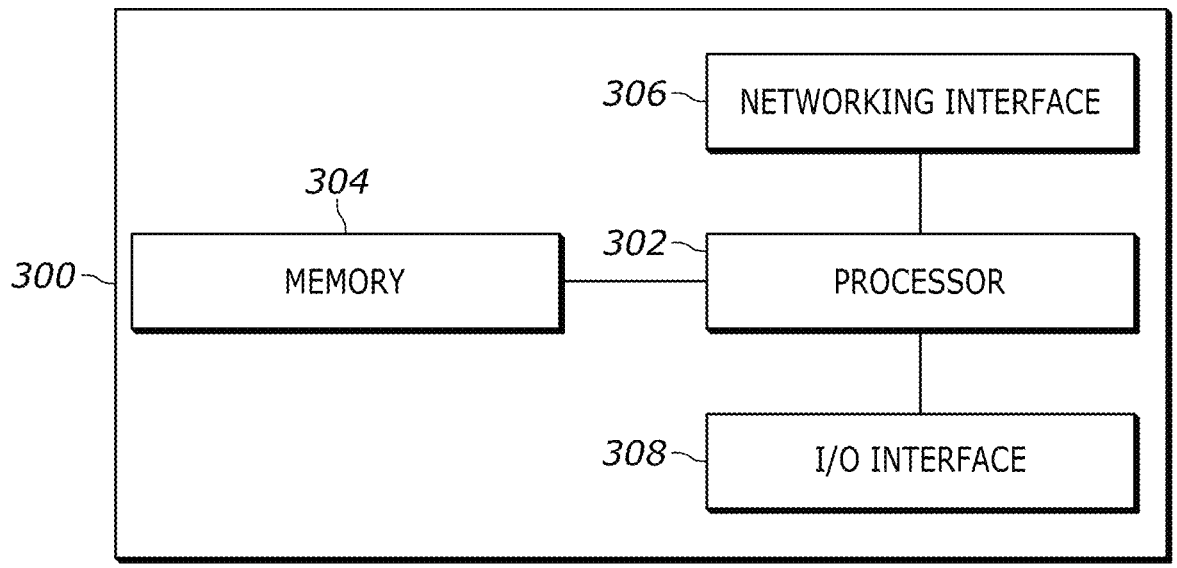
FIG. 3 is a block diagram of an example logic circuit for implementing example methods and/or operations described herein.

FIG. 3 is a block diagram representative of an example logic circuit capable of implementing, for example, one or more components of the example processing board 258 of FIG. 2 or, more generally, the example TMU 112.3 of FIG. 2. The example logic circuit of FIG. 3 is a processing platform 300 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 300 of FIG. 3 includes a processor 302 such as, for example, one or more microprocessors, controllers, and/or any suitable type of processor. The example processing platform 300 of FIG. 3 includes memory (e.g., volatile memory, non-volatile memory) 304 accessible by the processor 302 (e.g., via a memory controller). The example processor 302 interacts with the memory 304 to obtain, for example, machine-readable instructions stored in the memory 304 corresponding to, example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 300 to provide access to the machine-readable instructions stored thereon.

The example processing platform 300 of FIG. 3 also includes a network interface 306 to enable communication with other machines via, for example, one or more networks. The example network interface 306 includes any suitable type of communication interface(s) (e.g., wired and/or wireless interfaces) configured to operate in accordance with any suitable protocol(s) (e.g., Ethernet for wired communications and/or IEEE 802.11 for wireless communications).

The example, processing platform 300 of FIG. 3 also includes input/output (I/O) interfaces 308 to enable receipt of user input and communication of output data to the user. Such user input and communication may include, for example, any number of keyboards, mice, USB drives, optical drives, screens, touchscreens, etc.

Figure 4:
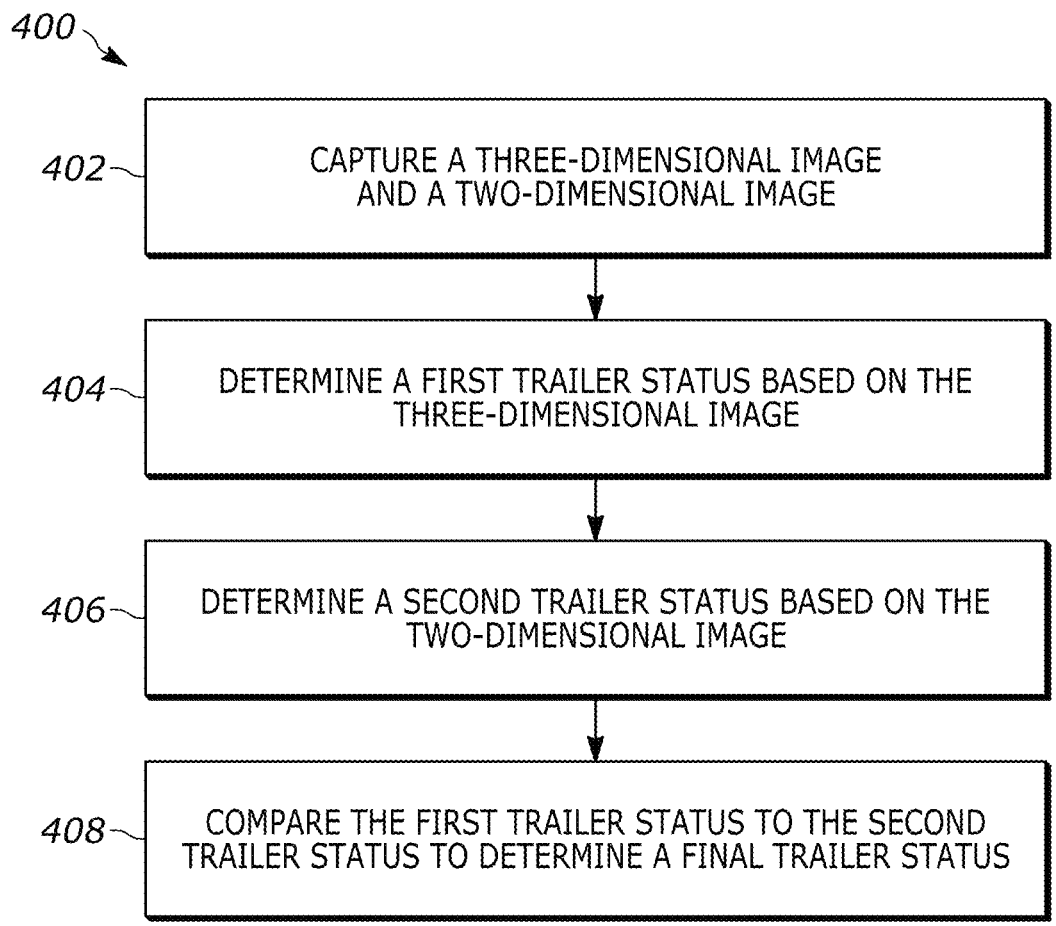
FIG. 4 is a flowchart representative of a method for determining a trailer status, in accordance with embodiments described herein.
Figure 5A:
FIG. 5A depicts a red-green-blue (RGB) image and a 3-D depth image of an interior of a container that represent one or more trailer statuses that may be determined using example methods and/or operations described herein.
Figure 5A:
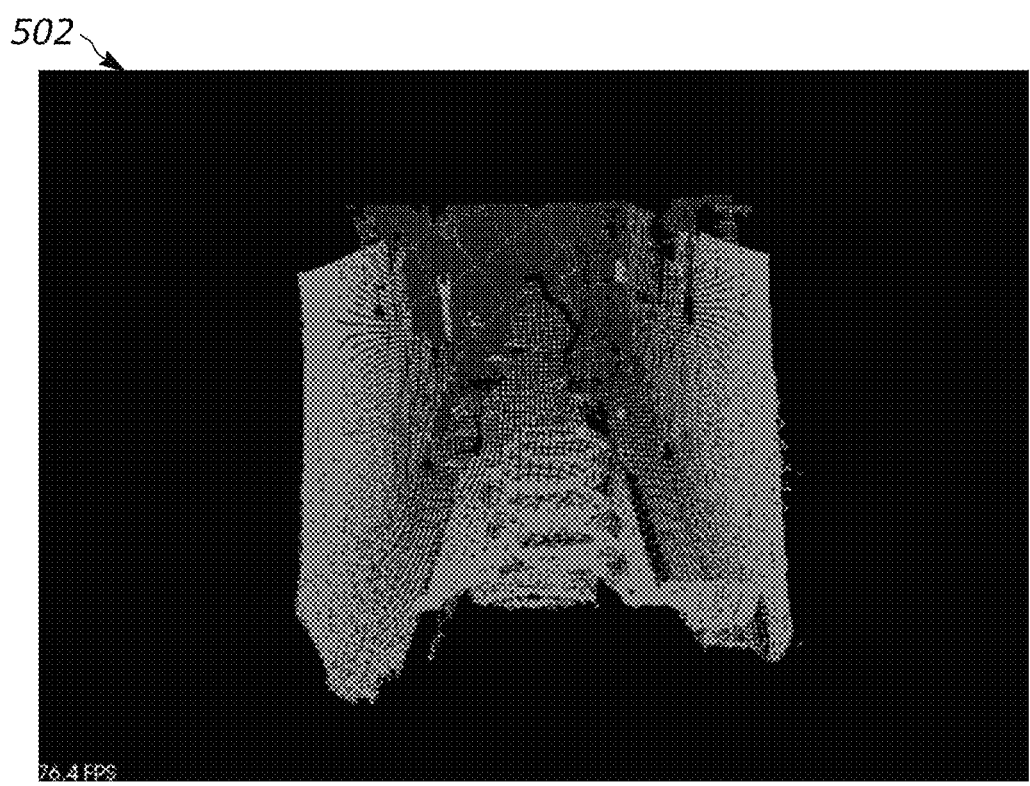
Figure 5B:
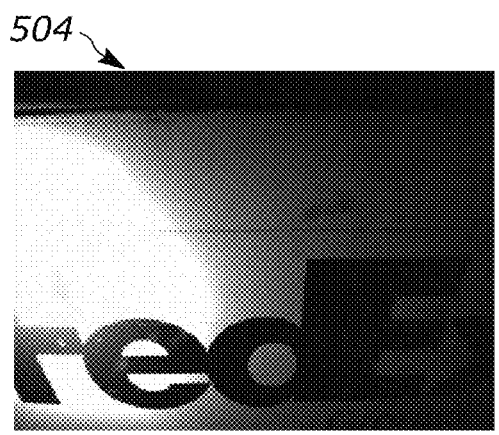
FIG. 5B depicts multiple situations that represent one or more trailer statuses that may be determined using example methods and/or operations described herein.
Figure 5B:
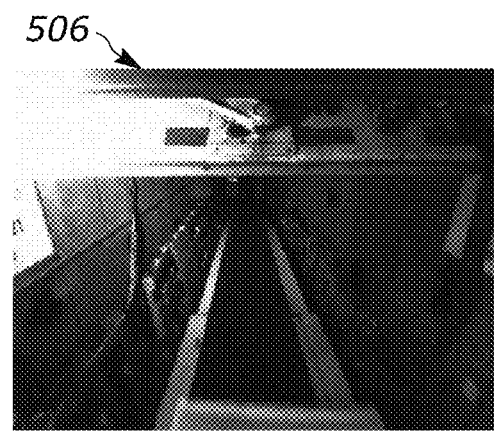
Figure 5B:
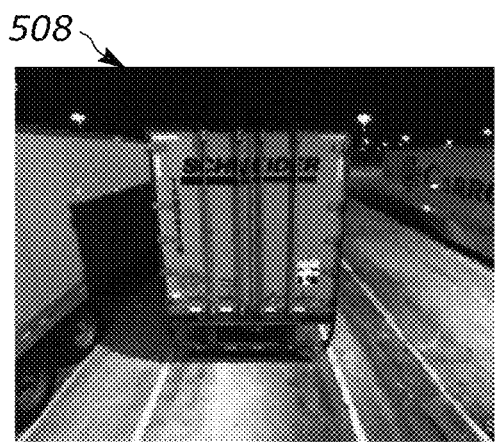
Figure 5B:
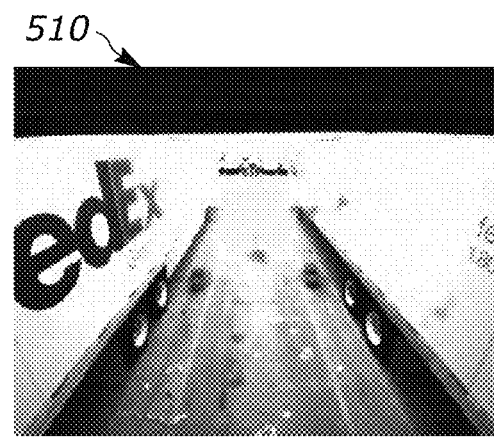
Figure 5B:
Figure 6:
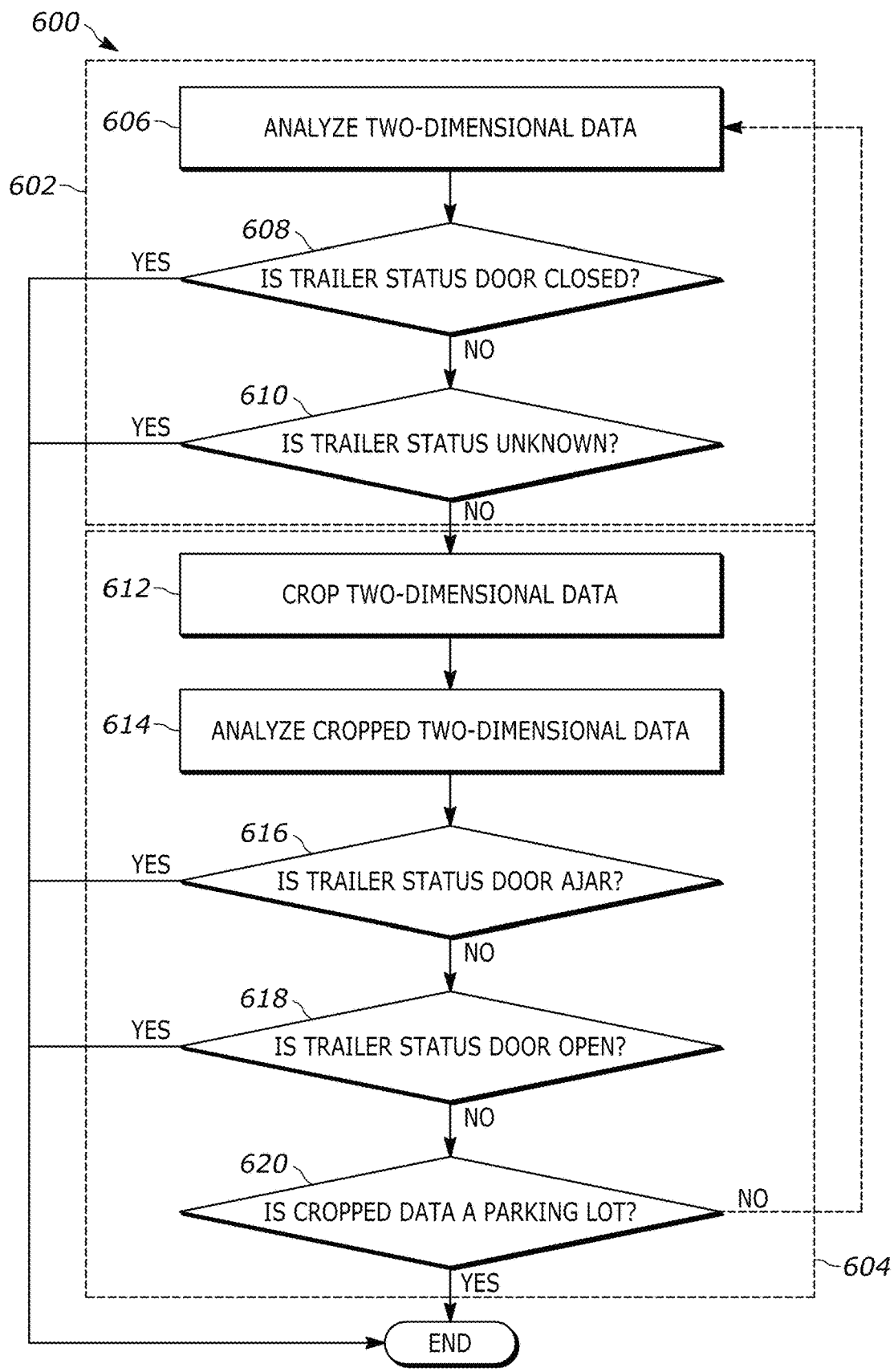
FIG. 6 is a flowchart representative of a machine learning image analysis technique utilized in the method of FIG. 4, and in accordance with embodiments described herein.

FIG. 4 is a flowchart representative of a method 400 for determining a trailer status (e.g., a status of trailer 102), in accordance with embodiments described herein. Method 400 describes a variety of embodiments, and several specific embodiments are described in reference to FIGS. 5, 6, and 7. Generally speaking, the method 400 includes capturing a three-dimensional image and a two-dimensional image (block 402), as depicted in FIGS. 5A and 5B. The method 400 then includes analyzing the three-dimensional image data to determine a first trailer status (block 404), and the two-dimensional data to determine a second trailer status (block 406), as illustrated in FIG. 6. Finally, the method 400 includes comparing the first trailer status to the second trailer status to determine a final trailer status (block 408), as illustrated by the decision model in FIG. 7.

The method 400 begins by capturing a three-dimensional image and a two-dimensional image (block 402). A 3D camera (e.g., 3D camera 254) may capture the three-dimensional image, such that the image may comprise three-dimensional image data having a plurality of points. A 2D camera (e.g., photo-realistic camera 256) may capture the two-dimensional image, such that the image may comprise two-dimensional image data. The 3D camera and/or the 2D camera may capture their respective images in response to a command provided by an operator, and/or upon suspected detection of the presence of a container. For example, a TMU (e.g., TMU 112.3) including a 3D camera and 2D camera may detect when a bay door 110 of FIG. 1A is raised, or may receive a control command from an operator instructing the TMU to capture an image of the associated loading bay (e.g., loading bay 106.3). The TMU may then capture, for example, a RGB trailer image 500 and a 3D trailer image 502, as illustrated in FIG. 5A. The RGB trailer image 500 may provide a RGB representation of the interior of a trailer parked at a loading bay. The 3D trailer image 502 may similarly represent the interior of the trailer parked at the loading bay, but it may include three-dimensional point data having a plurality of points that correspond to the interior of the trailer. It should be understood that the TMU may capture any number of images of any suitable type upon detecting and/or otherwise executing instructions to capture an image. Block 402 may be performed by, for example, the 3D camera 254 and photo-realistic camera 256 of FIG. 2.

As another example, the TMU may detect the presence of and capture an image of the trailer/container as the semi-truck, forklift, or other vehicle brings the trailer/container within the FOV of the TMU, but before the trailer/container door is fully open for analysis. In accordance with this example, and as depicted in FIG. 5B, the TMU may capture an image of a trailer when the trailer door is not fully open, as depicted in a closed door image 504 and an ajar door image 506. The TMU may capture the closed door image 504 before an operator or other personnel opens the trailer door, such that the trailer door appears completely closed. Similarly, the TMU may capture the ajar door image 506 during or after an operator or other personnel attempts to open the trailer door, such that the trailer door is not completely open when the TMU captures the ajar door image 506.

Additionally or alternatively the TMU may capture an image of a trailer when the trailer is not yet in position to be loaded/unloaded or a semi-truck, forklift, or other vehicle may remove the trailer/container from the FOV of the TMU before the TMU detects or otherwise executes instructions to stop capturing images of the loading area. In accordance with this example, the TMU may incorrectly detect the presence of a trailer or otherwise execute instructions to capture a partially away trailer image 508, an empty parking lot image 510, and/or an unknown image 512. The TMU may capture the partially away trailer image 508 as a semi-truck is backing into or pulling away from a loading dock (e.g., loading dock 106.3). The TMU may capture the empty parking lot image 510 before or after a semi-truck is scheduled to arrive with a trailer, such that no trailer is present at the loading dock. The TMU may capture the unknown image 512 under circumstances such that the TMU cameras (e.g., 3D camera 254 and photo-realistic camera 256) are unable to resolve much image data. For example, the TMU may capture the unknown image 512 when a bay door (e.g., bay door 110) is closed, so that the TMU cameras are unable to view the exterior of the loading bay.

It is to be understood that for each 2D image presented in FIGS. 5A and 5B, the TMU may additionally capture a corresponding 3D image, wherein each corresponding 3D image includes point data. For example, a 3D image corresponding to the closed door image 504 may feature a multitude of points having a depth corresponding to the distance from the TMU to the closed trailer door. Similarly, a 3D image corresponding to the empty parking lot image 510 may feature a fan-like or "scatter" pattern of points indicating a lack of returning signals to the ToF sensor.

Problematically, the scenario presented by the images of FIG. 5B may result in a TMU executing load metric analytics despite being unable to effectively view the trailer interior. For example, the scatter pattern represented by the 3D image corresponding to the empty parking lot image 510, as previously mentioned, includes dense groupings of points. The TMU may select a dense group of points that are planar within the scatter pattern of the 3D image corresponding to the empty parking lot image 510, and misinterpret that group of points as a floor plane, a wall plane, and/or any other plane of a trailer. The TMU may then analyze the remaining points of the scatter pattern as boxes, loaders, etc., such that the TMU may determine the scatter pattern to represent a partially or fully loaded trailer. Such an erroneous determination may, for example, skew aggregate statistics maintained by a shipping company related to load metrics, resulting in customer and internal confusion related to the unintelligible data produced by the faulty analytics. Moreover, performing analytics based on the erroneous determination of the presence of a container may waste processing time and power of the TMU system.

Thus, the method 400 continues by analyzing the three-dimensional image data to determine a first trailer status (block 404). The first trailer status may be "open," "closed," or "reset." Generally, these first trailer statuses indicate that the trailer door is open, closed, or reset. More specifically, an "open" first trailer status may correspond to the TMU determining that an open trailer door is present in the three-dimensional image data (e.g., as depicted in the 3D trailer image 502). A "closed" first trailer status may correspond to the TMU determining that a closed trailer door is present in the three-dimensional image data (e.g., as depicted in the closed door image 504). A "reset" first trailer status may correspond to, for example, the TMU determining that a trailer is pulling away from the loading bay without closing the trailer door (e.g., as depicted in the partially away trailer image 508). Block 404 may be performed by, for example, the processing board 258 of FIG. 2.

The TMU may analyze the three-dimensional image data according to any suitable 3D image analysis technique. For example, the TMU may utilize techniques to perform and/or assist in analyzing the three-dimensional image data including, but not limited to, planar segmentation, ray tracing, volume rendering, gradient shading, edge detection, and/or any other suitable technique or combination thereof. The TMU may utilize these image analysis techniques to crop, shift, cut, zoom, and/or any other suitable manipulation of the three-dimensional image data or combination thereof, and to analyze the features of the three-dimensional image data, such as the amplitude, ambient value, position, and/or any other quality of the three-dimensional image data or combination thereof. Moreover, the TMU may train and/or apply any suitable machine learning technique(s) to perform or assist in analyzing the three-dimensional image data. The TMU may use, for example, deep learning algorithms such as neural networks, convolutional neural networks (CNN), recurrent neural networks (RNN), and/or any other suitable machine learning technique or combination thereof.

As an example, and in embodiments, the TMU may iterate over a plurality of points included in the three-dimensional image data to determine a number of points that are consistent with a boundary of the container. The TMU may access, determine, and/or otherwise utilize established boundaries of a container to facilitate association techniques described in this embodiment. For example, the TMU may access these boundaries via internal memory (e.g., memory 304), retrieve the boundaries from an external source (e.g., an external server via networking interface 306), determine the boundaries based on preprocessing or otherwise analyzing the plurality of points, and/or any other suitable technique or combination thereof.

Generally, the boundaries of the container may establish coordinate value and depth value pairs representing the boundaries of the container (e.g., side walls, ceiling, floor, back wall). The TMU may determine coordinate values and depth values for each point in the plurality of points based on the signals received by the ToF sensor. The coordinate values may represent the position of the each point in the plurality of points with respect to a coordinate system overlaying the FOV of the ToF sensor (e.g., a Cartesian coordinate system overlay). The depth values may correspond to distances from the ToF sensor to the physical location represented by the associated point, and the TMU may associate certain coordinate and depth values with objects expected to exist at the physical location.

Accordingly, in these embodiments, the TMU may iterate over the plurality of points in the three-dimensional image data to determine a number of points that are consistent with a boundary of the container by comparing the coordinate values and depth values of each point in the plurality of points to the coordinate values and depth values of the boundaries of the container. For example, assume a first point in the three-dimensional image data includes coordinate values and a depth value indicating the first point is substantially similarly positioned to a corresponding point associated with a left wall of the container. In this situation, the TMU may determine that the first point is consistent with the left wall.

As another example, and in embodiments, the TMU may perform planar segmentation on the three-dimensional image data to determine planes within the container. Generally, the TMU may perform planar segmentation in an attempt to identify various planes within a container interior that may correspond to the various boundaries of the container (e.g., side walls, ceiling, floor, back wall). The TMU may associate coplanar groups of points, and thereafter assign boundary designations to the coplanar groups of points based on the coordinate values and depth values comprising the coplanar groups of points.

Accordingly, the TMU may analyze the three-dimensional image data to identify one or more groups of coplanar points with coordinate values and depth values corresponding to various boundaries of a container. For example, the TMU may identify a ground plane of the container by comparing the coordinate values to the depth values for each group of coplanar points to determine a height value for each identified plane. In practice, the TMU may identify a plane of the container that extends across the entire ToF sensor FOV, or any suitable portion of the ToF sensor FOV. For example, a trailer may be of a drop-frame configuration, such that the "floor" of the trailer may consist of multiple height values.

The method 400 continues by analyzing the two-dimensional image data to determine a second trailer status (block 406). Generally, the TMU or other suitable processor may utilize one or more machine learning techniques to analyze the two-dimensional image data. For example, and in embodiments, the TMU may utilize a CNN to determine the second trailer status. The second trailer status may be "open," "closed," "ajar," "parking lot," or "unknown." More specifically, the "open" second trailer status may correspond to the TMU determining that an open trailer door is present in the two-dimensional data (e.g., as depicted in the RGB trailer image 500). The "closed" second trailer status may correspond to the TMU determining that a closed trailer door is present in the two-dimensional data (e.g., as depicted in the closed door image 504). The "ajar" second trailer status may correspond to the TMU determining that a partially open trailer door is present in the two-dimensional data (e.g., as depicted in the ajar door image 506). The "parking lot" second trailer status may correspond to the TMU determining that no trailer (or trailer door) is present in the two-dimensional data (e.g., as depicted in the empty parking lot image 510). The "unknown" second trailer status may correspond to, for example, the TMU being unable to determine whether a trailer is present or absent in the two-dimensional data (e.g., as depicted in the unknown image 512). Block 406 may be performed by, for example, the processing board 258 of FIG. 2.

As mentioned, the TMU may utilize a machine learning technique (e.g., a CNN) to analyze the two-dimensional image data. Prior to utilizing the machine learning technique, the TMU may train a machine learning model based on (i) a set of prior two-dimensional image data and (ii) a set of corresponding trailer statuses. The set of corresponding trailer statuses may include indications that a respective image in the set of prior two-dimensional image data represents at least one of (i) a closed trailer door (e.g., closed door image 504), (ii) an ajar trailer door (e.g., ajar door image 506), (iii) an open trailer door (e.g., RGB trailer image 500), (iv) a parking lot (e.g., empty parking lot image 510), and/or (v) an unknown representation (e.g., unknown image 512). The TMU may then apply the machine learning model to the two-dimensional image data to generate the second trailer status.

As an example, assume the TMU receives an instruction, signal, and/or otherwise initiates a training sequence to train a machine learning model. The TMU may retrieve from memory (e.g., memory 304), receive from an external source (e.g., via networking interface 306), and/or otherwise access for use the set of prior two-dimensional image data and the set of corresponding trailer statuses. Broadly stated, the TMU may then analyze each respective image in the set of prior two-dimensional image data to determine various characteristics about each respective image, such as color, brightness, and/or any other two-dimensional characteristic. The TMU may then compare the various characteristics of a respective image to a respective corresponding trailer status to develop correlations between certain image characteristics and trailer statuses. The machine learning model may use these correlations to determine trailer statuses for future sets of two-dimensional image data; store the future sets of two-dimensional image data, the determined trailer status, and the actual trailer status; and use this stored data to further refine the correlations between certain image characteristics and trailer statuses.

It will be appreciated that the machine learning model training technique just described is for the purposes of illustration/example only, and the machine learning model utilized by the TMU may be trained in any suitable manner. Moreover, the machine learning model may be a single tiered or layered machine learning model, such that the machine learning model includes one filter, classifier, or other module sufficient to determine the second trailer status, as described herein. Additionally or alternatively, the machine learning model may be a multi-tiered or multi-layered machine learning model, such that the machine learning model includes a plurality of filters, classifiers, and/or other modules sufficient to determine the second trailer status, as described herein.

In any event, when the TMU applies the machine learning model to the two-dimensional image data, the TMU may similarly analyze the two-dimensional image data to determine various characteristics about the two-dimensional image data. The TMU may then determine a correlation strength between the various characteristics and each of the set of corresponding trailer statuses to generate a second trailer status based on the trailer status with the strongest correlation to the various characteristics of the two-dimensional image data. Accordingly, the TMU may determine that the two-dimensional image data is most correlated to a second trailer status of "open," "closed," "ajar," "parking lot," or "unknown."

In embodiments, the TMU may apply a two-layered machine learning model architecture, including a first machine learning model and a second machine learning model. The first machine learning model and the second machine learning model may be, for example, CNNs, and the TMU may train both models similarly to the training technique described above and/or in any other suitable manner. More specifically, the TMU may train the first machine learning model based on (i) a first set of prior two-dimensional image data and (ii) a first set of corresponding trailer statuses, and the second machine learning model based on (i) a second set of prior two-dimensional image data and (ii) a second set of corresponding trailer statuses.

In these embodiments, the first set of corresponding trailer statuses may include indications that a respective image in the first set of prior two-dimensional image data represents at least one of (i) the closed trailer door (e.g., closed door image 504), (ii) an other trailer status, and/or (iii) the unknown trailer status (e.g., unknown image 512). The other trailer status may indicate, for example, that the trailer door is open or ajar, or that the trailer is absent. Further in these embodiments, the second set of prior two-dimensional image data may be a set of prior cropped two-dimensional image data, and the second set of corresponding trailer statuses may include indications that a respective image in the set of prior cropped two-dimensional image data represents at least one of (i) an ajar trailer door, (ii) an open trailer door, or (iii) a parking lot. The TMU or other suitable image processor may generate the set of prior cropped two-dimensional image data by cropping the set of prior two-dimensional image data, as described further herein.

Generally speaking, and in reference to FIG. 6, the two machine learning model architecture described in these embodiments may logically flow in accordance with the flowchart 600. Moreover, the logical processes performed by and/or based on the output of the first machine learning model may be broadly represented by the blocks included in a first operations block 602. Correspondingly, the logical processes performed by and/or based on the output of the second machine learning model may be broadly represented by the blocks included in a second operations block 604.

Thus, the TMU may apply the first machine learning model to analyze the two-dimensional image data and determine a preliminary trailer status (block 606). The preliminary trailer status may indicate one of (i) a closed trailer door, (ii) an other trailer status, or (iii) an unknown trailer status. The TMU may then check whether the preliminary trailer status is the closed trailer door (block 608) or the unknown trailer status (block 610). If the TMU determines that the preliminary trailer status is the closed trailer door or the unknown trailer status, the TMU may designate the preliminary trailer status as the second trailer status and end the analysis of the two-dimensional image data ("Yes" branches of blocks 608, 610). The TMU may additionally, for example, store the preliminary trailer status, display the preliminary trailer status to an operator, and/or any other suitable action.

However, if the first machine learning model determines that the preliminary trailer status is the other trailer status, the TMU may determine that the preliminary trailer status is neither the closed trailer door or the unknown trailer status ("No" branches of blocks 608, 610). The TMU may then crop the two-dimensional image data to generate cropped two-dimensional image data (block 612). Generally, a top half of the two-dimensional image data contains an indication whether a trailer door is fully open, ajar, or the trailer is absent. Such an indication is necessary to distinguish the trailer statuses encompassed by the other trailer status. Thus, the TMU may crop the two-dimensional image data to remove a bottom half of the two-dimensional image data.

In this manner, unnecessary segments of the two-dimensional image data are removed prior to further image analysis, allowing the second machine learning model to focus on these indications and optimize processing time and resources. It is to be appreciated that the first machine learning model, the second machine learning model, and/or the TMU (e.g., via processor 302) may crop the two-dimensional image data, and that the TMU or other suitable cropping hardware/software may crop any suitable portion of the two-dimensional image data from the two-dimensional image data.

After generating the cropped two-dimensional data, the TMU may apply the second machine learning model to analyze the cropped two-dimensional data and determine the second trailer status (block 614). In this scenario, the second trailer status may indicate one of (i) an ajar trailer door, (ii) an open trailer door, or (iii) a parking lot. The TMU may then check whether the second trailer status is the ajar trailer door (block 616), the open trailer door (block 618), or the parking lot (block 620). If the TMU determines that the second trailer status is the ajar trailer door, the open trailer door, or the parking lot, the TMU may end the analysis of the two-dimensional image data ("Yes" branches of blocks 616, 618, 620). The TMU may additionally, for example, store the second trailer status, display the second trailer status to an operator, and/or any other suitable action.

However, if the second machine learning model determines that the second trailer status is not the ajar trailer door, the open trailer door, or the parking lot, the TMU may determine that the second trailer status is undetermined ("No" branches of blocks 616, 618, 620). Accordingly, the TMU may determine that the two-dimensional image data should be re-analyzed to generate a second trailer status. The TMU may then re-initiate the logical flow embodied by the flowchart 600 by re-applying the first machine learning model to the two-dimensional image data. Additionally or alternatively, in response to determining that the second trailer status is undetermined, the TMU may generate an error message, alert signal, and/or any other suitable indication that the TMU may store in memory (e.g., memory 304), transmit for display to an operator, and/or any other suitable action.

Once the TMU determines the second trailer status, the method 400 proceeds by comparing the first trailer status to the second trailer status to determine a final trailer status (block 408). Generally, the TMU may determine the final trailer status by evaluating the similarity of the first trailer status and second trailer status. In embodiments, the TMU may determine whether the first trailer status is substantially similar to the second trailer status. If the TMU determines that the first trailer status is substantially similar to the second trailer status, the TMU may further determine the final trailer status based on either the first trailer status or the second trailer status. For example, if both the first trailer status and the second trailer status are an open trailer door, the TMU may determine a strong similarity between the first trailer status and the second trailer status because they are identical. Thus, the TMU may determine that the final trailer status is an open trailer door.

However, the first trailer status and the second trailer status may not be identical. If the first trailer status is an open trailer door and the second trailer status is an ajar trailer door, the TMU may determine a relatively strong similarity between the first trailer status and the second trailer status because they both indicate an at least partially open trailer door. Moreover, if the first trailer status is an open trailer door and the second trailer status is a closed trailer door, the TMU may determine a weak similarity because the two statuses indicate completely different scenarios (e.g., open door v. closed door). In embodiments, if the TMU determines that the first trailer status is not substantially similar to the second trailer status, the TMU may further determine the final trailer status based on a set of tested values indicating which of the first trailer status and the second trailer status is more accurate. For example, the TMU may retrieve from memory (e.g., memory 304), receive from an external source (e.g., via networking interface 306), and/or otherwise access a decision model 700, as depicted in FIG. 7.

Generally speaking, the decision model 700 depicts a model decision framework that the TMU or other suitable processor may use to determine the final trailer status by resolving any potential discrepancies between the first and second trailer statuses. The decision model 700 includes a set of first trailer statuses 702, a set of second trailer statuses 704, and a set of final trailer statuses 706. The set of first trailer statuses 702 may include a closed trailer door, an open trailer door, and a reset status. The set of second trailer statuses may include a closed trailer door, an open trailer door, an ajar trailer door, a parking lot, and an unknown status.

Superficially, the set of final trailer statuses 706 may include a closed trailer door, an open trailer door, an ajar trailer door, and a parking lot. The TMU or other suitable processor may incorporate each status included in the set of final trailer statuses 706 based on a comparison of a first trailer status and a second trailer status. More specifically, the set of final trailer statuses 706 may reflect a set of tested values indicating which of the first trailer status and the second trailer status is more accurate based on the specific first trailer status and second trailer status being compared. For example, an operator or other technician may manually evaluate prior sets of three-dimensional image data and two-dimensional image data and compare the corresponding first trailer status and second trailer status, respectively. The operator or technician may then develop empiric determinations concerning the accuracy of three-dimensional image data and two-dimensional image data in certain situations.

To illustrate, assume an operator evaluates three-dimensional image data and two-dimensional image data corresponding to a situation where a trailer has not yet pulled into an imaged loading bay (e.g., empty parking lot image 510). The first trailer status resulting from the TMU's analysis of the three-dimensional image data may indicate an open trailer door or reset status due to the scatter effect of the three-dimensional image data, as previously described. The second trailer status resulting from the TMU's analysis of the two-dimensional image data may indicate a parking lot because the absence of a trailer is readily identified in analysis of the two-dimensional image data. Based on the relative unreliability of the three-dimensional image data compared to the two-dimensional image data in this circumstance, the operator may determine that the TMU should designate the second trailer status as the final trailer status. Accordingly, the operator may hardcode instructions for the TMU to consistently designate the second trailer status as the final trailer status whenever the first trailer status is an open trailer door or reset status and the second trailer status is a parking lot, as depicted by the parking lot status 708.

As another example, assume the first trailer status indicates an open trailer door or a reset status and the second trailer status indicates a closed trailer door. Practically, the three-dimensional image data may reflect a large cluster of points at a depth similar to a trailer door, but the image data may be misinterpreted as boxes/crates/etc. filling an open trailer or a random clustering of collinear points in an otherwise scattered data set indicative of an absent trailer. On the other hand, the two-dimensional image data may clearly indicate a closed trailer door, and the TMU or other suitable processor may reliably identify the closed trailer door from the two-dimensional image data in that situation. Thus, the operator may determine that the TMU should designate the second trailer status as the final trailer status. Accordingly, the operator may hardcode instructions for the TMU to consistently designate the second trailer status as the final trailer status whenever the first trailer status is an open trailer door or reset status and the second trailer status is a closed trailer door, as depicted by the closed trailer door status 710.

In yet another example, assume the first trailer status indicates a closed trailer door and the second trailer status indicates an open trailer door. Practically, the two-dimensional image data may reflect a closed trailer door, but the image data may be misinterpreted as an open trailer door. On the other hand, the three-dimensional image data may clearly indicate a closed trailer door, and the TMU or other suitable processor may reliably identify the closed trailer door from the three-dimensional image data in that situation. Thus, the operator may determine that the TMU should designate the first trailer status as the final trailer status. Accordingly, the operator may hardcode instructions for the TMU to consistently designate the first trailer status as the final trailer status whenever the first trailer status is a closed trailer door and the second trailer status is an open trailer door, as depicted by the closed trailer door status 712.

Similarly, an operator may proceed to create a set of empirical determinations based on tested values between each potential combination of first trailer status and second trailer status. Thus, this set of empirical determinations may resolve any potential discrepancies between the first and second trailer statuses by consistently designating a trailer status as the final trailer status when a disagreement occurs. However, it should be understood that these empirical determinations may also be carried out or otherwise facilitated automatically by the TMU or other suitable processing device (e.g., client device 204).

For example, the TMU may assist in the development of the set of empirical determinations by recording disagreements between the first and second trailer statuses. The TMU may then use the result of these disagreements (e.g., the correct final trailer status) to refine the CNNs or other machine learning models responsible for determining the first and second trailer statuses. Moreover, the result of the disagreements between the first and second trailer statuses may be used to refine the decision model 700. Specifically, if the first trailer status or the second trailer status becomes more reliable over time when determining a specific trailer status, due to refinements of the machine learning models or otherwise, the TMU or an operator may adjust the set of empiric determinations defining the decision model 700 accordingly.

In this manner, the methods and systems of the present disclosure achieve notable improvements over conventional methods and systems. For example, unlike conventional methods and systems for determining a trailer status, the methods and systems of the present disclosure utilize both two-dimensional image analysis and three-dimensional image analysis. This combined analysis allows the methods and systems of the present disclosure to minimize the impact of false positives and false negatives attributable to either imaging technique, as described herein. Accordingly, utilizing two-dimensional image analysis and three-dimensional image analysis in this manner allows the methods and systems of the present disclosure to more accurately determine a trailer status based on data captured from the FOV of the ToF sensor or any other suitable imaging system/apparatus.

Consequently, the methods and systems of the present disclosure solve the problems associated with conventional methods and systems. By more accurately determining trailer statuses from data captured from the FOV of the ToF sensor, the methods and systems of the present disclosure decrease the amount of wasted processing time and resources of processing instrumentation (e.g., TMU 112.3) attempting to process load metrics of trailers that are not open, not present in the ToF FOV, or otherwise unidentifiable (e.g., unknown image 512). This, in turn, increases the accuracy of statistics (e.g., load metrics) shipping companies may maintain concerning their loading facilities, and increases overall customer satisfaction because the statistics presented to customers will not contain any erratic, unintelligible, or otherwise flawed data.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, the term "container" shall refer to any container transportable by at least one of a vehicle, a train, a marine vessel, and airplane, and configured to store transportable goods such as boxed and/or unboxed items and/or other types of freight. Accordingly, an example of a container includes an enclosed container fixedly attached to a platform with wheels and a hitch for towing by a powered vehicle. An example of a container also includes an enclosed container removably attached to a platform with wheels and a hitch for towing by a powered vehicle. An example of a container also includes an enclosure that is fixedly attached to a frame of a powered vehicle, such as the case may be with a delivery truck, box truck, etc. As such, while the exemplary embodiment(s) described below may appear to reference one kind of a container, the scope of the invention shall extend to other kinds of container, as defined above. Furthermore, the term "trailer" is an example of application of a container, in particular, a container used with a vehicle, such as a powered vehicle, like a delivery truck, box truck, etc.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for determining a trailer status, comprising:
   capturing a three-dimensional image and a two-dimensional image, the three-dimensional image comprising three-dimensional image data, and the two-dimensional image comprising two-dimensional image data;
   determining a first trailer status based on the three-dimensional image data;
   determining a second trailer status based on the two-dimensional image data; and
   comparing the first trailer status to the second trailer status to determine a final trailer status wherein determining the second trailer status further comprises:
  training a first machine learning model based on (i) a first set of prior two-dimensional image data and (ii) a first set of corresponding trailer statuses, and a second machine learning model based on (i) a second set of prior two-dimensional image data and (ii) a second set of corresponding trailer statuses;
  applying the first machine learning model to the two-dimensional image data to generate a preliminary trailer status, wherein the preliminary trailer status indicates one of (i) a closed trailer door, (ii) an other trailer status, or (iii) an unknown trailer status; and
  in response to generating a preliminary trailer status indicating the other trailer status, applying the second machine learning model to the two-dimensional image data to generate the second trailer status.

2. The method of claim 1, further comprising:
in response to generating the preliminary trailer status indicating the other trailer status, cropping the two-dimensional image data; and
applying the second machine learning model to the cropped two-dimensional image data to generate the second trailer status.

3. The method of claim 1, wherein the first set of corresponding trailer statuses includes indications that a respective image in the first set of prior two-dimensional image data represents at least one of (i) the closed trailer door, (ii) the other trailer status, or (iii) the unknown trailer status;
  wherein the second set of prior two-dimensional image data is a set of prior cropped two-dimensional data; and
  wherein the second set of corresponding trailer statuses includes indications that a respective image in the set of prior cropped two-dimensional image data represents at least one of (i) an ajar trailer door, (ii) an open trailer door, or (iii) a parking lot.

4. The method of claim 1, wherein comparing the first trailer status to the second trailer status to determine the final trailer status further comprises determining whether the first trailer status is substantially similar to the second trailer status; and
  responsive to determining that the first trailer status is substantially similar to the second trailer status, determining the final trailer status based on either the first trailer status or the second trailer status; and
  responsive to determining that the first trailer status is not substantially similar to the second trailer status, determining the final trailer status based on a set of tested values indicating which of the first trailer status and the second trailer status is more accurate.

5. An apparatus for determining a trailer status, comprising:
  a housing;
  an imaging assembly at least partially within the housing and configured to capture a three-dimensional image and a two-dimensional image, the three-dimensional image comprising three-dimensional image data, and the two-dimensional image comprising two-dimensional image data; and
  a controller communicatively coupled to the imaging assembly, the controller having a processor and a memory, the memory storing instructions that, when executed by the processor, cause the controller to:
    determine a first trailer status based on the three-dimensional image data;
    determine a second trailer status based on the two-dimensional image data; and
    compare the first trailer status to the second trailer status to determine a final trailer status
  wherein the instructions further cause the controller to:
    train a first machine learning model based on (i) a first set of prior two-dimensional image data and (ii) a first set of corresponding trailer statuses, and a second machine learning model based on (i) a second set of prior two-dimensional image data and (ii) a second set of corresponding trailer statuses;
    apply the first machine learning model to the two-dimensional image data to generate a preliminary trailer status, wherein the preliminary trailer status indicates one of (i) a closed trailer door, (ii) an other trailer status, or (iii) an unknown trailer status; and
    in response to generating a preliminary trailer status indicating the other trailer status, apply the second machine learning model to the two-dimensional image data to generate the second trailer status.

6. The apparatus of claim 5, wherein the instructions further cause the controller to:
  in response to generating the preliminary trailer status indicating the other trailer status, crop the two-dimensional image data; and
  apply the second machine learning model to the cropped two-dimensional image data to generate the second trailer status.

7. The apparatus of claim 5, wherein the first set of corresponding trailer statuses includes indications that a respective image in the first set of prior two-dimensional image data represents at least one of (i) the closed trailer door, (ii) the other trailer status, or (iii) the unknown trailer status;
  wherein the second set of prior two-dimensional image data is a set of prior cropped two-dimensional data; and
  wherein the second set of corresponding trailer statuses includes indications that a respective image in the set of prior cropped two-dimensional image data represents at least one of (i) an ajar trailer door, (ii) an open trailer door, or (iii) a parking lot.

8. The apparatus of claim 5, wherein the instructions further cause the controller to:
  compare the first trailer status to the second trailer status to determine the final trailer status by determining whether the first trailer status is substantially similar to the second trailer status;
  responsive to determining that the first trailer status is substantially similar to the second trailer status, determine the final trailer status based on either the first trailer status or the second trailer status; and
  responsive to determining that the first trailer status is not substantially similar to the second trailer status, determine the final trailer status based on a set of tested values indicating which of the first trailer status and the second trailer status is more accurate.

9. A system for determining a trailer status, comprising:
  a user interface;
  a trailer monitoring unit (TMU) mounted proximate a loading bay and communicatively connected with the user interface, the TMU including:
    a housing; and
    an imaging assembly at least partially within the housing and configured to capture a three-dimensional image and a two-dimensional image, the three-dimensional image comprising three-dimensional image data, and the two-dimensional image comprising two-dimensional image data;

wherein the TMU is configured to:
  determine a first trailer status based on the three-dimensional image data;
  determine a second trailer status based on the two-dimensional image data; and
  compare the first trailer status to the second trailer status to determine a final trailer status wherein the TMU is further configured to:
  train a first machine learning model based on (i) a first set of prior two-dimensional image data and (ii) a first set of corresponding trailer statuses, and a second machine learning model based on (i) a second set of prior two-dimensional image data and (ii) a second set of corresponding trailer statuses;
  apply the first machine learning model to the two-dimensional image data to generate a preliminary trailer status, wherein the preliminary trailer status indicates one of (i) a closed trailer door, (ii) an other trailer status, or (iii) an unknown trailer status; and
  in response to generating a preliminary trailer status indicating the other trailer status, apply the second machine learning model to the two-dimensional image data to generate the second trailer status.

10. The system of claim 9, wherein the TMU is further configured to:
  in response to generating the preliminary trailer status indicating the other trailer status, crop the two-dimensional image data; and
  apply the second machine learning model to the cropped two-dimensional image data to generate the second trailer status.

11. The system of claim 9, wherein the first set of corresponding trailer statuses includes indications that a respective image in the first set of prior two-dimensional image data represents at least one of (i) the closed trailer door, (ii) the other trailer status, or (iii) the unknown trailer status;
  wherein the second set of prior two-dimensional image data is a set of prior cropped two-dimensional data; and
  wherein the second set of corresponding trailer statuses includes indications that a respective image in the set of prior cropped two-dimensional image data represents at least one of (i) an ajar trailer door, (ii) an open trailer door, or (iii) a parking lot.

* * * * *